J. NIEZNALSKI & J. BELCZYNSKI.
ORE CHARGING MACHINE FOR RETORTS.
APPLICATION FILED APR. 20, 1918.

1,296,998.

Patented Mar. 11, 1919.
7 SHEETS—SHEET 3.

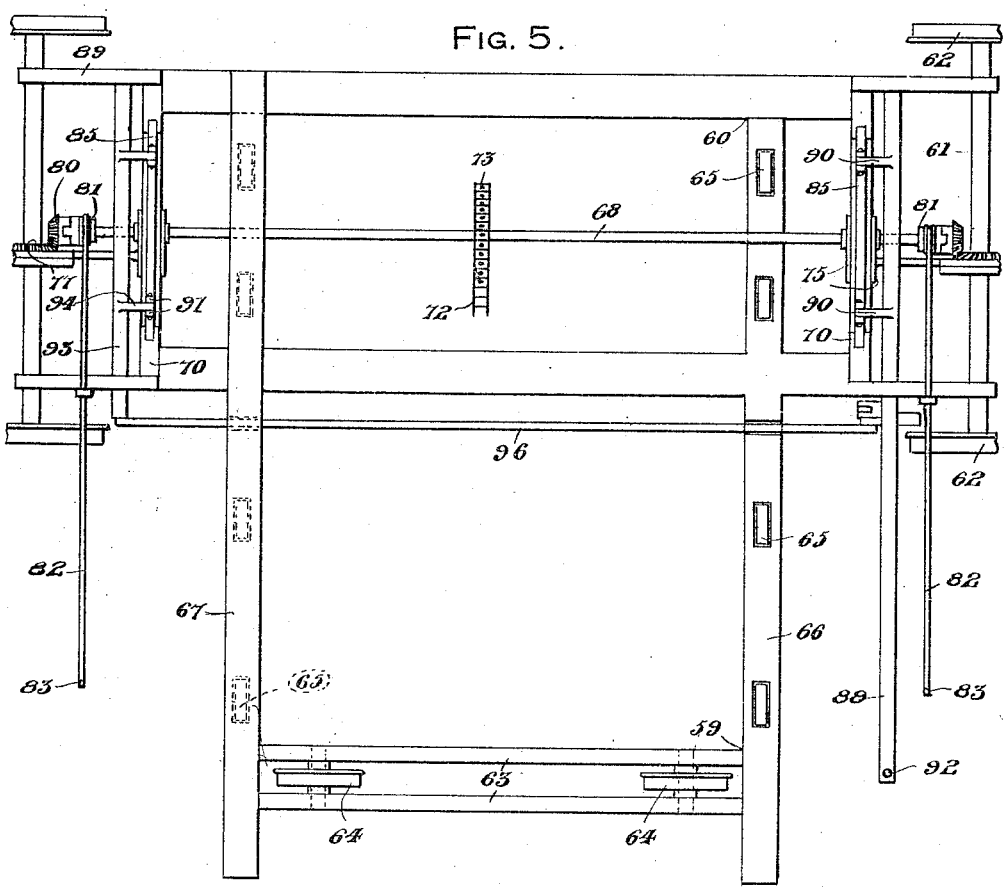

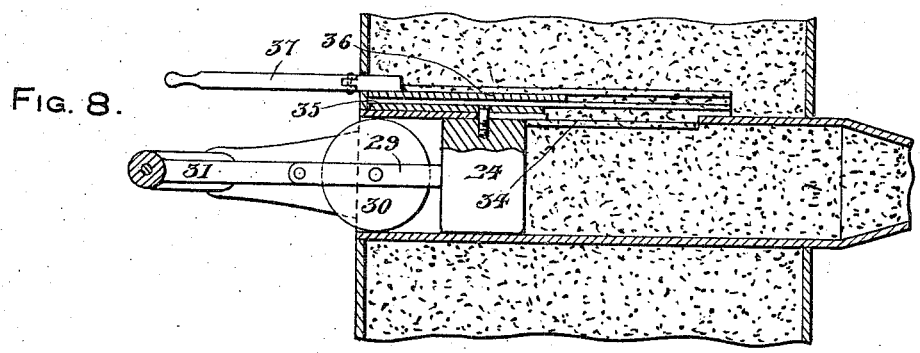
FIG. 8.
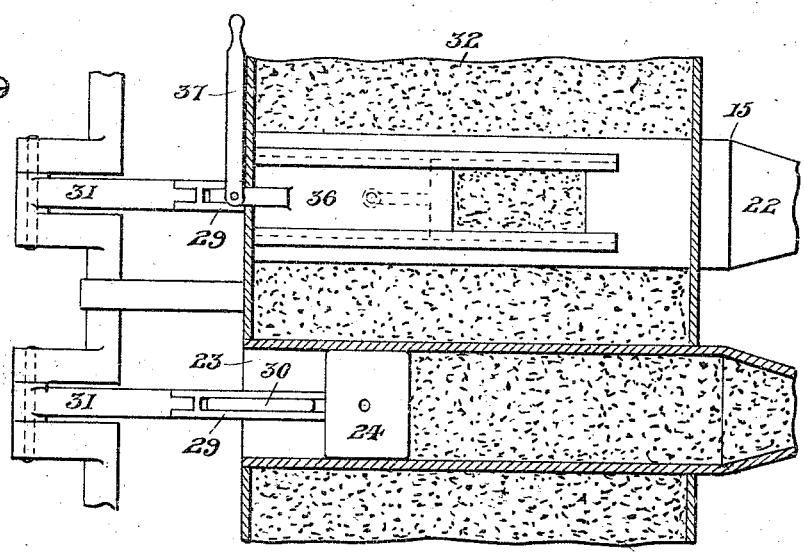
FIG. 9.
FIG. 10.
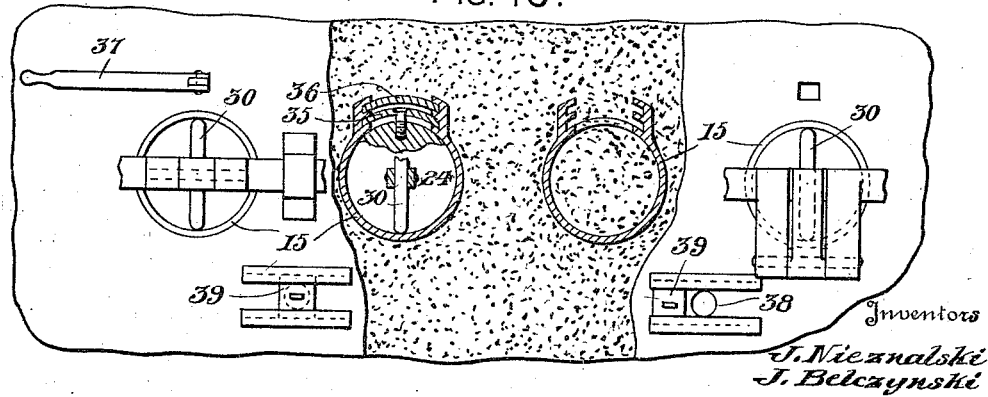

J. NIEZNALSKI & J. BELCZYNSKI.
ORE CHARGING MACHINE FOR RETORTS.
APPLICATION FILED APR. 20, 1918.

1,296,998.

Patented Mar. 11, 1919.
7 SHEETS—SHEET 6.

Inventors
J. Nieznalski
J. Belczynski

By A. M. Wilson
Attorney

J. NIEZNALSKI & J. BELCZYNSKI.
ORE CHARGING MACHINE FOR RETORTS.
APPLICATION FILED APR. 20, 1918.
1,296,998.
Patented Mar. 11, 1919.
7 SHEETS—SHEET 7.
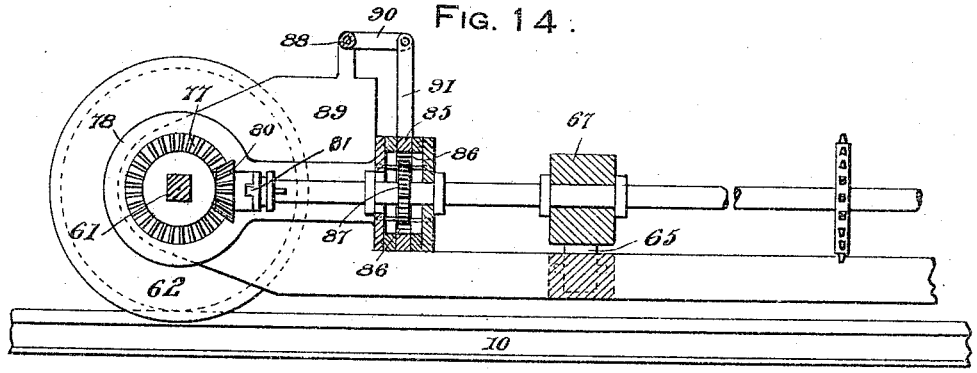
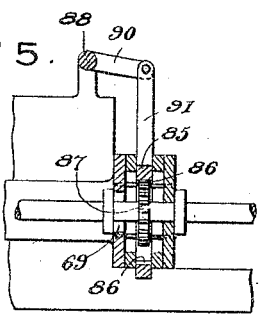
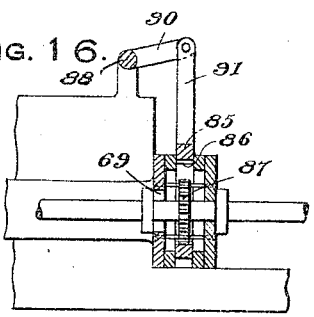
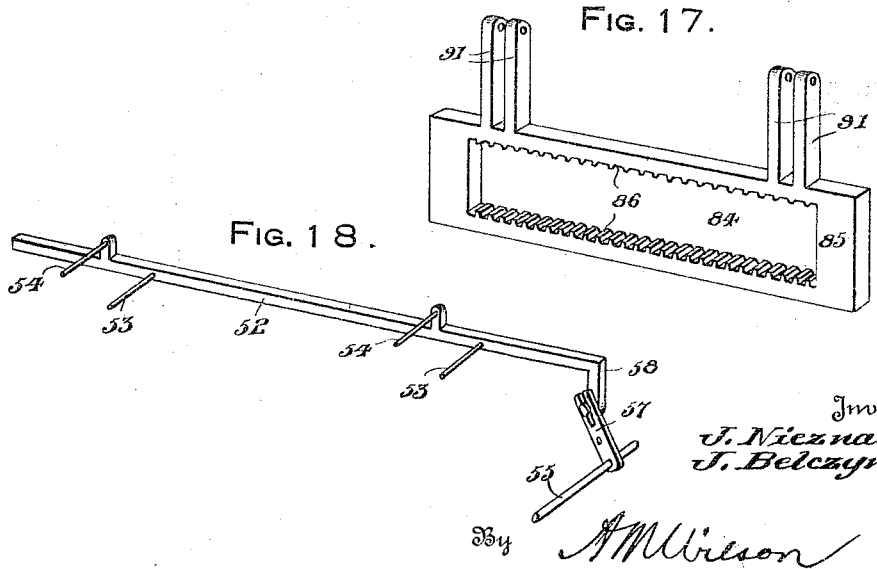
Inventors
J. Nieznalski
J. Belczynski
By A. W. Wilson
Attorney

UNITED STATES PATENT OFFICE.

JOZEPH NIEZNALSKI AND JAN BELCZYNSKI, OF DETROIT, MICHIGAN.

ORE-CHARGING MACHINE FOR RETORTS.

1,296,998.　　　Specification of Letters Patent.　　Patented Mar. 11, 1919.

Application filed April 20, 1918.　Serial No. 229,777.

*To all whom it may concern:*

Be it known that we, JOZEPH NIEZNALSKI and JAN BELCZYNSKI, citizens of the United States of America, residing at Detroit, in the county of Wayne and State of Michigan, have invented certain new and useful Improvements in Ore-Charging Machines for Retorts, of which the following is a specification.

The primary object of the invention is the provision of a charging device for furnaces and retorts whereby a large number of retorts may be simultaneously charged with ore with great rapidity, the entire device requiring the attention of only a few workmen.

A further object of the device is to provide a charging means for retort furnaces readily positionable adjacent the open mouths of the retorts for readily and quickly charging the retorts with ore while the device may be retracted from the furnace and removed to a distant point or another furnace at the completion of the operation.

A still further object of the device is to provide a retort-charging means adapted for motor operation whereby ore is simultaneously projected into all of the retorts and the device then readily retracted from the furnace and propelled by the motors to a distant point, a supply of ore being provided for the device whereby the charging operation may be continued as long as desired.

It is also designed to provide a wheeled truck arranged upon a track for mounting a transversely shiftable platform thereon while an ore container adapted for projecting the ore into a plurality of retorts is mounted upon the platform. Upon this platform a suitable motor is provided readily controlled for charging the ore from the hopper into the retorts; for transversely shifting the platform with its hopper toward and away from the charging position with respect to the retorts; and also for propelling the truck when the platform is retracted to cause the device to travel upon its track to any desired distant point such for instance as another furnace designed to be successively charged with the ore. The means whereby the single motor is designed for projecting the ore, shifting the platform and propelling the truck forms a material part of the invention and in connection with which it will be noted these three functions may be performed singly or collectively as desired, it being probable however that the ore-charging would never be employed during the movements of the platform or the truck but the truck might in many instances be traveling upon its track at the same time that the platform was being laterally moved upon the motor truck.

In the drawings forming a part of this application and in which like numerals refer to corresponding parts throughout the several views, Figure 1 is a side elevation of the device illustrating the same in operation charging the retorts with ore from the hopper;

Fig. 5 is a top plan view of the truck with a portion of the platform removed;

Fig. 6 is an elevational view illustrating the controlling means for the charging mechanism;

Fig. 7 is a side elevation thereof;

Fig. 8 is a vertical detail sectional view through one of the ore-charging tubes and the adjacent portion of the hopper;

Fig. 9 is a horizontal sectional view through the hopper and two of the charging tubes;

Fig. 10 is a detail elevational view, slightly enlarged, of the rear portion of the hopper and with parts broken away;

Fig. 14 is a vertical longitudinal sectional view through an end portion of the truck and platform;

Fig. 15 is a detail view of the direction-changing means for the shiftable platform;

Fig. 16 is a similar view with the mechanism arranged in its opposite position for moving the platform in an opposite direction;

Fig. 17 is a perspective view of one of the shiftable double racks employed with the direction-changing mechanism of the platform; and Fig. 18 is a perspective view of the clutch lever connections for the charging mechanism.

Figure 1:
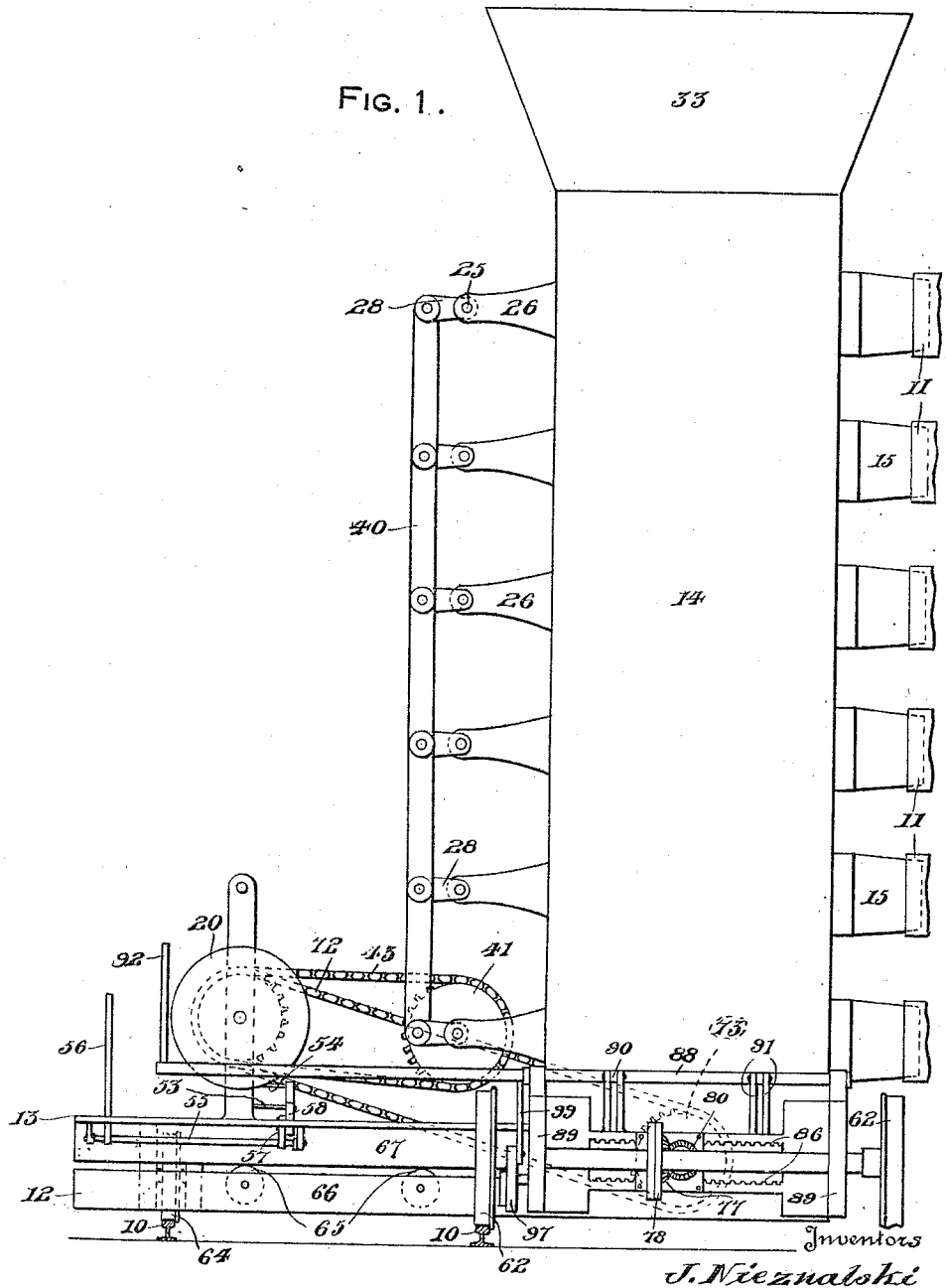

Our device being designed for charging a plurality of retorts simultaneously, the same is herein illustrated mounted for traveling upon a track formed of three rails 10 positioned adjacent the furnace to be charged, the open mouthed retorts 11 of which are herein illustrated in Fig. 1. The device broadly consists of a truck 12 mounted for traveling upon the rails 10 and having a platform 13 carried for transverse shifting upon the truck 12 while a hopper 14 for the ore is mounted upon the forward portion of the platform 13 for bringing the ore-charging tubes 15 of the hopper into operative proximity with the retorts 11.

Figure 3:
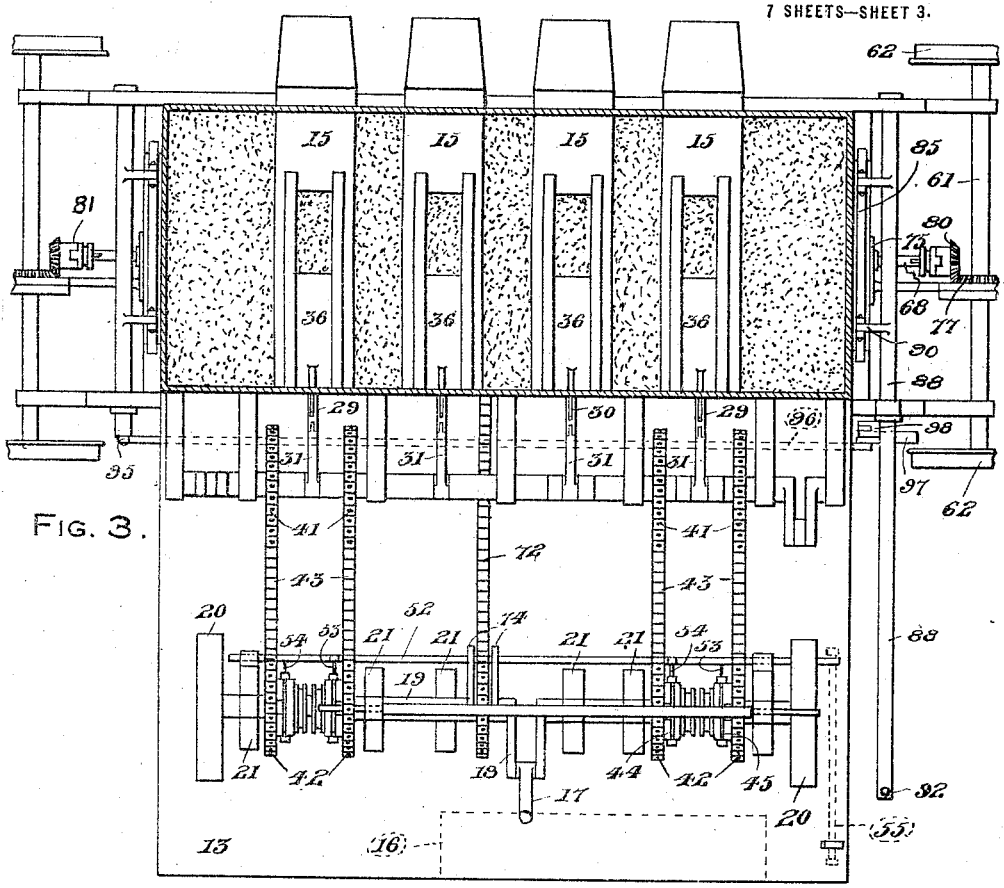
Fig. 3 is a transverse horizontal sectional view of Fig. 1.
Figure 4:
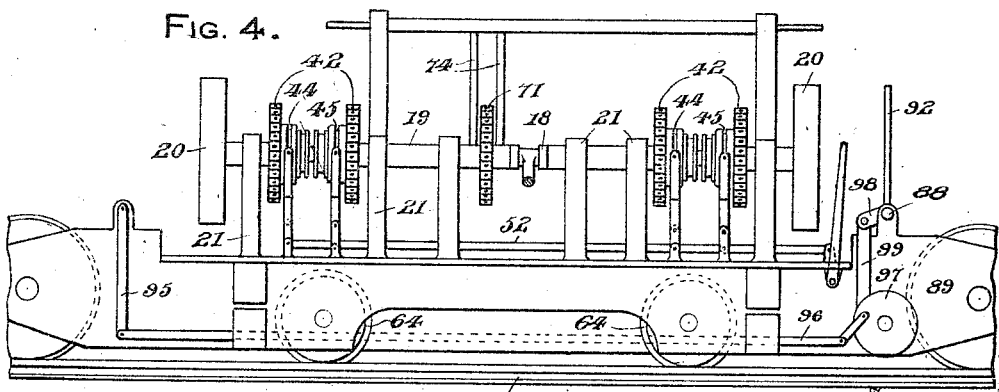
Fig. 4 is a rear elevation of the truck and platform with the hopper removed and parts broken away.
Figure 11:
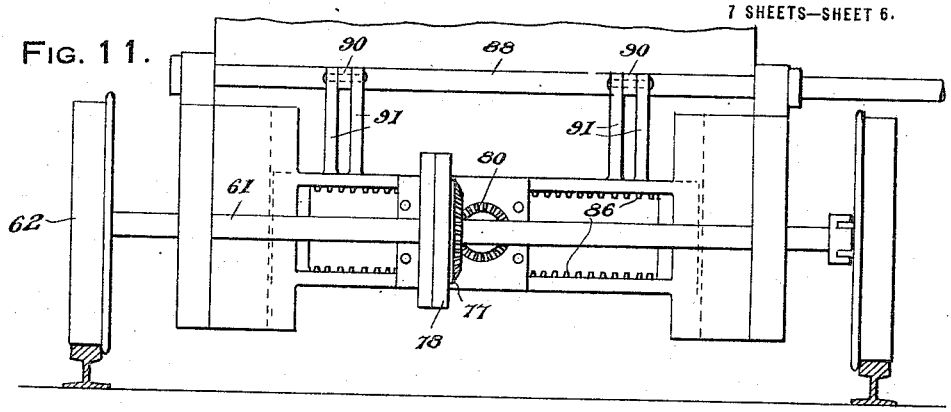
Fig. 11 is an end elevational view of the truck showing the driving means for the truck and the direction-changing means for the platform.
Figure 12:
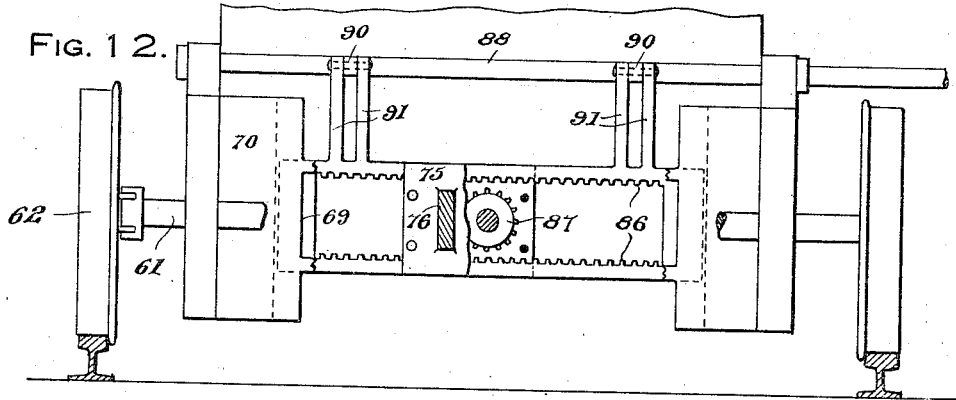
Fig. 12 is a similar view of the parts broken away and shown in vertical section.
Figure 13:
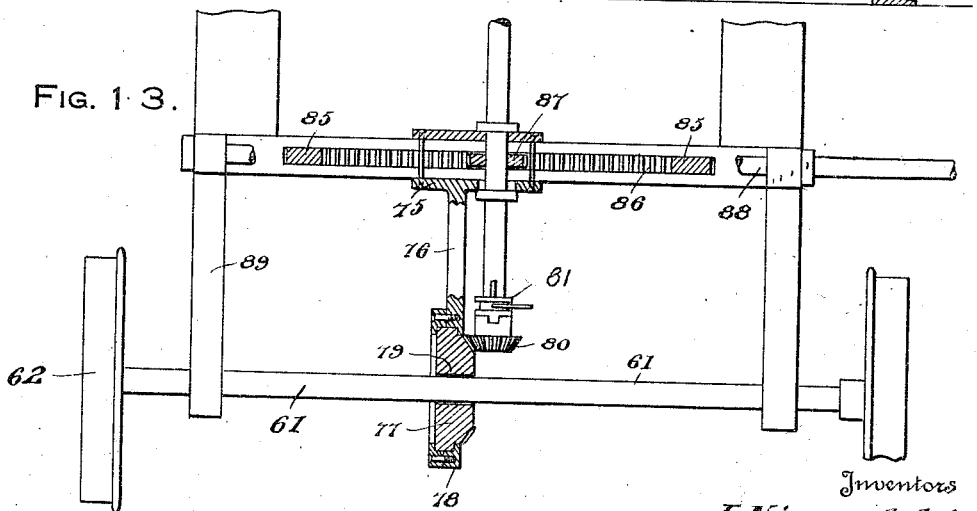
Fig. 13 is a top plan view of the same with portions shown in horizontal section.

A motor 16 as indicated by dotted lines in Fig. 3 and being of any desired form is mounted upon the platform 13 rearwardly of the hopper 14 with its reciprocating power rod 17 operatively attached to the crank 18 of a driving shaft 19 for the device. A balance or fly-wheel 20 is provided upon each end of the shaft 19 while said shaft is journaled through a plurality of brackets 21 carried by the platform 13.

Figure 2:
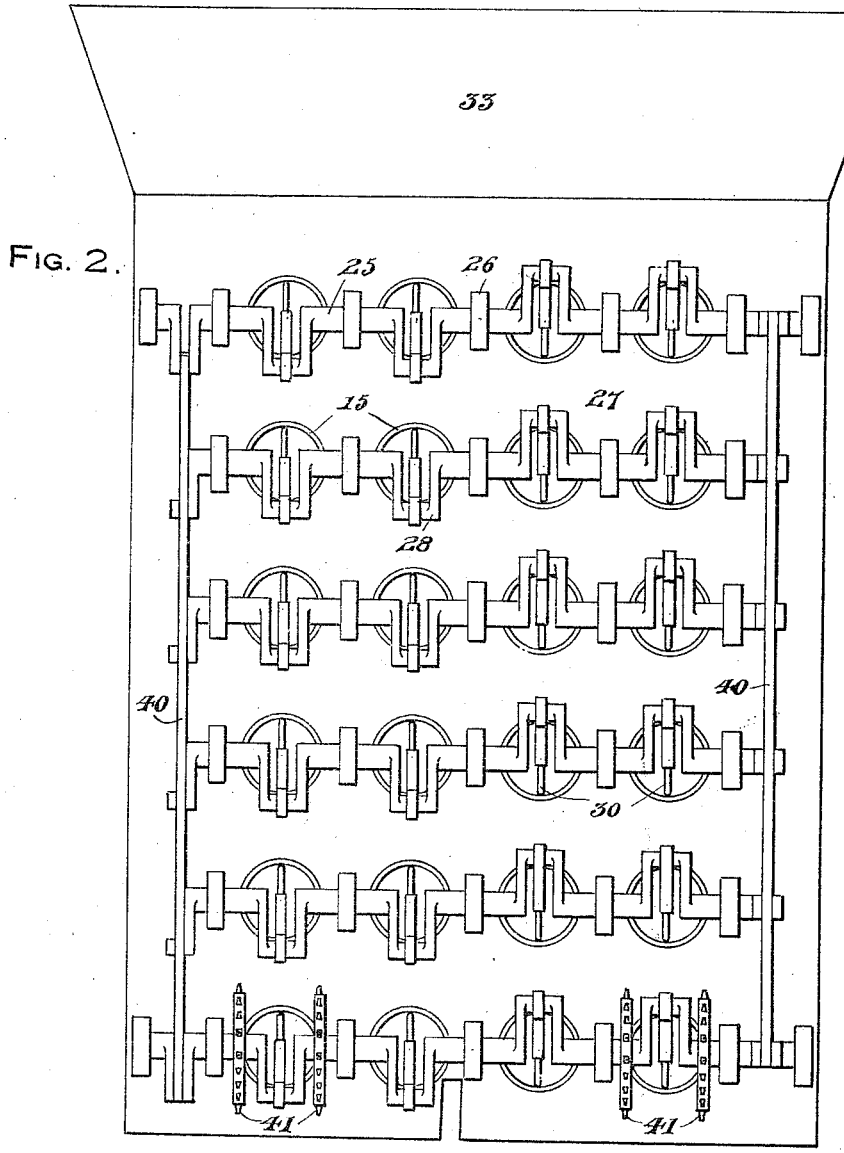
Fig. 2 is a rear elevation of the hopper showing the charging mechanism thereon.

The charging tubes 15 of the hopper 14 are transversely positioned therethrough in parallel rows and of a number corresponding to the number of retorts 11 to be charged with ore. The open forward ends 22 of the tubes 15 are suitably tapered for slightly entering the mouths of the retorts 11, while the rear ends 23 of said tubes are open for the free insertion of pistons 24 adapted to reciprocate in the tubes and acting as pushers to project the ore from the discharge ends 22 thereof. A crank-shaft 25 is provided for each horizontal row of tubes 15, the said shafts being journaled in posts 26 upon the rear wall 27 of the hopper 14, a crank 28 being provided for each of the said tubes. An operating rod 29 is carried by each piston 24 having a roller 30 adapted to travel in the tube 15 while a link 31 connects the outer free end of the rod 29 with the adjacently positioned crank 28 of one of the shafts 25. The cranks 28 are preferably positioned with the adjacent pairs of the cranks extending in opposite directions as best shown in Fig. 2 of the drawings and whereby the tubes 15 throughout one-half of the hopper will be operating at a single time or in other words, the pistons 24 throughout one-half of the tubes 15 will be moving in a direction opposite to the remainder of the said pushing pistons 24.

The hopper 14 is adapted to be filled with ore 32 through the enlarged open tube 33 thereof, the ore readily filling all of the tubes 15 through openings 34 in the upper sides of the tubes. A slide 35 is carried by each piston 24 for closing the opening 34 when the piston is moved forwardly during the charging operation, the opening 34 of each tube 15 being open for the free admission of the ore into the tubes when the pistons 24 are retracted as illustrated in Figs. 8 and 9 of the drawings. The slide 35 prevents the ore from passing through the opening 34 rearwardly of the piston 24 during the feeding movement thereof. A manually controlled slide 36 is provided upon each tube 15 above the aforementioned slide 35 which controls the normal size of the entrance opening to the tubes, thereby determining the amount of ore which is to be fed to the retort by the tube. An operating lever 37 is hingedly carried by each slide 36 and projects through the front wall 27 of the hopper so that the slides 36 may be readily adjusted, while the levers 37 may be folded back against the hopper wall 27 when the slides 36 are opened to their greatest extent.

Poker holes 38 may be provided through the wall 27 for stirring up the ore 32 whenever desired, covers 39 being provided for said holes. A link connector 40 is provided adjacent each end of the hopper wall 27 attached to the ends of the crank-shafts 25 and whereby the revolving of the lower crank shaft by means of a plurality of sprocket-wheels 41 will revolve all of the shafts 25 for the simultaneous operation of the entire number of pistons 24 which are employed with the device. The driving shaft 19 is provided with pairs of sprocket-wheels 42 journaled thereon and connected to the sprocket-wheels 41 by means of sprocket chains 43. Spring-pressed clutch members 44 and 45 are splined to the shaft 19 between each pair of sprocket-wheels 42, the said clutch members being adapted for movement in opposite directions, whereby the members of each pair of sprocket-wheels 42 will be positioned for revolving simultaneously with the shaft 19 or will be free from influence by the shaft as may be desired by the person in charge. A clutch fork 46 is provided for each clutch member 44 pivoted intermediate its ends as at 47 to a post 48 upon the platform 13 while the similar fork 49 of each clutch member 45 is pivoted at its lower end as at 50 to a similar post 51. A shifting bar 52 is transversely shiftably mounted above the platform 13 having pins 53 for engaging the lower ends of the forks 46 and with pins 54 arranged in a plane thereabove operatively connected to the forks 49. A suitable shaft 55 is journaled beneath the platform 13 having a hand lever 56 extending upwardly therefrom to a point above the platform for readily grasping to control the clutch members 44 and 45 simultaneously, this being accomplished by means of the bar 52 which is operatively attached to the shaft 55 by a lever 57 pivotally connected to a depending end portion 58 of the bar 52.

When the truck 12 has been moved to the proper position adjacent the furnace and the platform 13 is shifted for operatively positioning the tube ends 22 relatively of the retorts 11, all in the manner hereinafter specifically set forth, the attendant may readily shift the hand lever 56 for moving the bar 52 in the proper direction to simultaneously engage all of the clutch members 44 and 45 with all of the sprocket-wheels 42. The entire number of pistons 24 will then be started to operate and each forward movement of the pistons 24 will force a charge of the ore 32 out of its respective tube 15 and into the adjacent retort 11. At the conclusion of the charging of the furnace, the hand lever 56 will be reversely moved for disconnecting all of the clutch members 44 and 45 from all the sprocket-wheels 42, thereby rendering the pistons 24 inoperative until the sprocket-wheels 42 are again clutched up with the driving shaft 19.

The means will now be described whereby the driving shaft 19 is utilized for propelling the entire device in its travel along the rails 10 as well as for shifting the platform 13 laterally of the truck 12 into and out of its operative position. The truck 12 comprises a T-shaped frame having a rearwardly extending portion 59 and a transverse forward portion 60. An axle 61 is journaled at each end of the frame portion 60 arranged with wheels 62 mounted upon the rails 10. Transverse braces 63 are carried adjacent the rear end of the frame portion 59 of the truck arranged with flanged wheels 64 for traveling upon the third rail of the track rails 10, as illustrated in Fig. 1 of the drawings. Rollers 65 are journaled in the main beams 66 of the truck 12 upon which are the supporting beams 67 of the platform 13. A driven shaft 68 is journaled through the platform beams 67 and project through longitudinal openings 69 in the ends 70 of the truck frame portion 60 has operative connection with the axles 61 whereby the wheels 62 are driven and the device readily propelled in its travel upon the rails 10. A sprocket-wheel 71 upon the driving shaft 19 is connected by means of a sprocket-chain 72 with a similar wheel 73 upon the truck shaft 68 while a suitable guard 74 is provided for the wheel 71.

A journaling block 75 for the shaft 68 is slidably mounted in the opening 69 of each end 70 of the truck frame portion 60 arranged with an arm 76. A beveled gear 77 is journaled in a head 78 at the free end of each arm 76 while the gear 77 has a squared central opening 79 whereby the gear is slidably mounted upon the squared axle 61 of the driving wheels 62. A pinion 80 is arranged at each opposite end of the shaft 68 in constant mesh with the adjacent gear 77 while a clutch 81 is provided for each of the pinions 80 for connecting said pinions with and disconnecting them from the shaft 68. Suitable operating rods 82 are provided for the clutches 81 having upright hand levers 83.

When it is desired to propel the device in either direction upon the track rails 10, the clutches 81 are set by means of the levers 83 as required for operatively connecting whichever one of the axles 61 it is desired to drive by the motor 16, it being understood that when one of said axles is being turned, the other axle must be unclutched. When driving by one of the axles 61, the device will be propelled in one direction and when driving by the other axle 61 the device will travel in an opposite direction. It will be seen that the shaft 68 moves bodily with the shifting of the platform 67 which is permitted by the slidable connection of the block 75 with the truck ends 70 as well as the slidable mounting of the gears 77 upon the axle 61. The device may be driven in this manner upon the track rails 10 to any desired position by means of the motor 16 and while the platform 13 with its hopper 14 are at any adjustment upon the truck.

Double racks 84 in the form of a rectangular plate 85 having opposite toothed portions 86 are vertically adjustably carried by the said truck ends 70, while a gear 87 is arranged within each rack 84 for selectively meshing with the opposite toothed portions thereof, the said gears 87 being secured to the shaft 68. A rod 88 is journaled in the end extension 89 at one end of the truck portion 60 having arms 90 pivotally connected to ears 91 of the adjacent rack 84. An upright hand lever 92 is carried adjacent the free end of the rod 88 in close proximity of the hand lever 56 and it will be seen that by shifting the lever 92, the rod 88 may be partially revolved for elevating the rack 84 and bringing the lower toothed portion 86 thereof in meshing engagement with the adjacent gear 87. The corresponding rack 84 and gear 87 at the opposite end of the truck frame portion 60 being similarly arranged by means hereinafter described, it will be seen that the revolving of the shaft 68 will cause the gears 87 to travel in one direction longitudinally of the racks 84 and whereby the entire platform 13 and hopper 14 will be shifted upon the truck 12 and riding upon the rollers 65. A reverse movement of the lever 92 permits and assists the racks 84 to lower bringing the upper toothed portions 86 thereof into meshing relations with the gears 87 whereby the platform 13 is shifted in an opposite direction upon the truck 12 when the shaft 68 is revolved by means of the motor 16. It will be evident that with the shaft 68 adapted to revolve in only one direction, the meshing of the gears 87 with the opposite toothed portions 86 of the racks 84 causes the travel of the platform 67 in either direction desired upon the track 12 from its rearward rest position to its forward charging position and vice versa.

A relatively short rod 93 is journaled in the end extensions 89 at the opposite end of the truck frame portion 60 from the aforementioned rod 88, the rod 93 having arms 94 pivotally connected to the ears 91 of its respective rack plate 85. A depending link 95 is carried by the rear end of the rod 93 connected by a pivotal double link 96 with a disk 97 journaled upon the frame extension 89 at a point beneath the rod 88. A finger 98 upon the rod 88 is pivotally connected to the disk 97 by a link 99 and whereby any movement imparted to the rod 88 by means of the lever 92 correspondingly moves the disk 97 and the link 96 so that the rack plates 85 are simultaneously shifted either upwardly or downwardly for engaging the desired toothed portions 86 of the racks 84 with the gears 87.

The manner of controlling the travel of the truck 12 upon its wheels 62 and 64 over the track rails 10 has already been described, the movement of the device being effected in either desired direction by manipulating the hand levers 83 of the clutches 81. The complete operation of the device will be fully understood from the foregoing detailed description of the separate elements, it being seen that the truck 12 may travel to a point adjacent the retorts 11 with the platform 13 in its normal rear position upon the track, while the lever 92 may be then manipulated for properly shifting the racks 84 to permit the motor-driven shaft 68 to move the plaftorm 13 with its hopper 14 adjacent the retorts 11 and with the outlet ends 22 in alinement with the open mouths of the retorts 11. The lever 56 is then utilized for operatively connecting the sprocket-wheels 42 with the driving shaft 19 and the hopper 14 being filled with ore 32, the pistons 24 of the tubes 15 accomplish the charging of the retorts 11 with the ore. When the retorts are filled, the sprocket-wheels 42 are disconnected from the shaft 19 by means of the lever 56 and the platform 13 moved rearwardly upon the truck 12 by reversing the position of the lever 92 while the levers 83 may then be suitably controlled for operating the traction wheels 62 at either end of the truck frame portion 60 and the device caused to travel in the desired direction to a distant point such as another furnace to be charged by the device. It will be understood that the hopper 14 may be kept constantly supplied with ore dumped into the mouth 33 thereof by any convenient means. A furnace may be easily and quickly charged with ore by means of this device with little expenditure of manual labor or motive power and it will be understood that the capacity of the device may be arranged to suit the varying working conditions and requirements of the plant where the device is employed.

What we claim as new is:

1. An ore-charging device comprising a hopper, ore-feeding tubes extending therethrough with a discharge end projecting outwardly of the hopper and having ore-receiving openings within the hopper, manually controlled slides for said openings, ejecting pistons for the ore reciprocatingly mounted within said tubes, rods carried by the pistons, positioning disks upon said rods within the tubes, simultaneously operable crank-shafts journaled upon the hopper, and operating connections between the cranks of said shafts and said piston rods.

2. An ore-charging device comprising a hopper, ore-feeding tubes extending therethrough with a discharge end projecting outwardly of the hopper and having ore-receiving openings within the hopper, manually controlled slides for said openings, ejecting pistons for the ore reciprocatingly mounted within said tubes, rods carried by the pistons, positioning disks upon said rods within the tubes, simultaneously operable crank-shafts journaled upon the hopper, operating connections between the cranks of said shafts and said piston rods, a platform upon which said hopper is mounted, and means adapted for moving said platform laterally or longitudinally at either the same or different times.

3. A device of the class described comprising a truck having a substantially T-shaped frame, rollers carried by the frame, a platform mounted upon said rollers adapted for shifting transversely of the frame, a shaft arranged longitudinally of the frame adapted for driving the wheels of the truck, operative connections between the said shaft and platform whereby the platform is adapted for shifting movement when the truck is either moving or at rest, ore-feeding means upon the platform adapted for positioning in feeding proximity to a furnace upon the traveling of the truck and the relative shifting of the platform thereon, and a motor on said platform to drive said shaft and actuate said ore feeding means.

4. In combination with a truck having opposite driving axles, a platform transversely shiftable upon said truck, a motor upon said platform, a shaft driven thereby longitudinally arranged upon said platform, operative connections between the said shaft and said axles, and means adapted for shifting said platform and said shaft transversely to the truck during the operative driving of said axles by said shaft.

5. In combination with a truck having opposite driving axles, a platform transversely shiftable upon said truck, a motor upon said platform, a shaft driven thereby longitudinally arranged upon said platform, operative connections between the said shaft and said axles, means adapted for shifting said platform and said shaft transversely relative to the truck during the operative driving of said axles by said shaft, and a plurality of simultaneously operable ore-feeding means upon the platform operatively connected to said shaft.

6. In combination with a truck having spaced driving axles, a platform transversely shiftable upon the truck, a shaft journaled in said platform, gear connections between the said shaft and axles in constant mesh during the relative movements of said truck and platform, and double racks carried by the truck adapted for selective operative engagement with said shaft whereby the platform may be shifted forwardly or rearwardly upon the truck.

7. In combination with a truck having squared propelling axles journaled at opposite points thereof, driving gears for said axles slidably arranged upon each axle, a platform adapted for mounting an ore-charging means thereon shiftably positioned upon said truck, journal blocks slidably carried by the truck connected to the said gears and slidable therewith, a motor-driven shaft journaled upon said platform and through the said blocks operatively connected to said gears, and means for controlling the connections between said shaft and gears.

8. In combination with a truck having squared propelling axles journaled at opposite points thereof, driving gears for said axles slidably arranged upon each axle, a platform adapted for mounting an ore-charging means thereon shiftably positioned upon said truck, journal blocks slidably carried by the truck connected to the said gears and slidable therewith, a motor-driven shaft journaled upon said platform and through the said blocks operatively connected to said gears, rectangular double racks surrounding said shaft carried by the truck, gears upon the shaft within said rack adapted for selectively meshing with the toothed portions of the rack for shifting the platform in either direction, and means adapted for elevating and lowering the racks at will for operative engagement with the said gears.

9. A device of the class described comprising a wheeled truck, rollers carried by the frame of said truck, a platform mounted on said rollers to move transversely of the truck, a motor mounted on said platform and operatively connected to the truck wheels, means operated by said motor to move the same and the platform transversely of the truck, a hopper carried by said platform, a horizontal tube communicating with said hopper, and means to expel the contents of said tube operatively connected to said motor.

In testimony whereof we affix our signatures.

JOZEPH NIEZNALSKI.
JAN BELCZYNSKI.

Copies of this patent may be obtained for five cents each, by addressing the "Commissioner of Patents, Washington, D. C."